United States Patent [19]

van der Lely et al.

[11] Patent Number: 4,805,557
[45] Date of Patent: Feb. 21, 1989

[54] METHOD OF AND AN IMPLEMENT FOR MILKING AN ANIMAL

[75] Inventors: Ary van der Lely, Maasland; Cornelis J. G. Bom, Rozenburg, both of Netherlands

[73] Assignee: Cornelis van der Lely, N.V., Maasland, Netherlands

[21] Appl. No.: 3,610

[22] Filed: Jan. 15, 1987

[30] Foreign Application Priority Data

Jan. 16, 1986 [NL] Netherlands ..................... 8600076

[51] Int. Cl.$^4$ ............................................. A01J 3/00
[52] U.S. Cl. ................... 119/14.08; 119/14.1; 119/14.18
[58] Field of Search ................ 119/14.08, 14.1, 14.01, 119/14.14, 14.18, 14.13, 14.47

[56] References Cited

U.S. PATENT DOCUMENTS

| | | | |
|---|---|---|---|
| 1,193,402 | 8/1916 | Laughlin | 119/14.08 |
| 3,973,520 | 8/1976 | Flocchini | 119/14.08 |
| 4,508,058 | 4/1985 | Jakobson et al. | 119/14.02 |

FOREIGN PATENT DOCUMENTS

| | | | |
|---|---|---|---|
| 3572 | of 1900 | Denmark | 119/14.47 |
| 0194729 | 9/1986 | European Pat. Off. | |
| 209202 | 1/1987 | European Pat. Off. | 119/14.47 |
| 213660 | 3/1987 | European Pat. Off. | 119/14.08 |
| 1091886 | 5/1984 | U.S.S.R. | 119/14.47 |

Primary Examiner—John Weiss
Attorney, Agent, or Firm—Penrose Lucas Albright; Robert A. Miller

[57] ABSTRACT

A mechanism that automatically attaches teat cups to a cow's teats including four telescopically extensible members which each carry a teat cup via a teat cup support which resiliently supports its corresponding teat cup in an upright position. Each extensible member has its own stepper motor to raise and lower the corresponding teat cup and a further stepper motor to move the extensible member horizontally within limits. An ultra-sonic radiation member is carried on a platform between the teat cups as seen in plan which emits a horizontal ultra-sonic beam that is reflected and focused upwardly and caused by movement of the reflector systematically to scan the cow's udder and to locate the teats by their comparatively shorter distances from the reflector. The disposition of the teats is thus sensed by a sensor unit which controls a stepper motors and causes the extensible members independently to raise the teat cups to be received by and attached to corresponding teats for the milking operation.

17 Claims, 3 Drawing Sheets

METHOD OF AND AN IMPLEMENT FOR MILKING AN ANIMAL

BACKGROUND OF THE INVENTION

The invention relates to a method of milking an animal such as a cow, wherein, after the position of one or more teats of the animal's udder has been determined, one or more teat cups are attached to said teat or teats by the responsive adjustment of mechanically extensible supports for the teat cups.

The position of the udder's teats can be determined through a variety of procedures. For example, it is possible for the shape of a teat to be recognised with the aid of an electronic camera and, when accomplished from two directions, the position of the teat involved can be computed. Alternatively, it is possible to provide the teat with a permanent dye which can be detected by means of a sensor.

SUMMARY OF THE INVENTION

The invention contemplates a method of milking animals, in which method the position of the udder's teats can be detected in an effective manner.

To that end, according to the invention, the udder is scanned from a position lower than the teats by means of a sensor which perceives the distance to an object, the extreme end of a teat being recognized because the sensor-to-end-of-the-teat distance is less than the perceived distance to parts that are situated near said teat end. This higly effective manner of detection is based on the fact that, viewed from below, the teats are generally the most prominent parts of the udder and this prominence is discernible by a sensor which can determine the distance to an object.

In accordance with a further feature of the invention, the animal's udder can be scanned systematically and, after scanning, several teat cups can be attached simultaneously. In accordance with an other feature of the invention, it is alternatively possible for the relevant teat cup to be attached each time a teat is detected during the scan.

In accordance with an other feature of the invention, after the scanning of the entire udder to determine the relevant number of teats, the position of each individual teat is detected, whereafter the relevant teat cup is attached immediately. During scanning of the entire udder, the image observed is compared with an image stored in a processor, which image was, for example, obtained during a previous detection of the udder of that same animal. On the one hand, this scanning operation serves as an additional check on the condition of the udder or that of the animal, and on the other as a check on the location and position taken by the animal in the milking parlor. After the entire udder has been scanned, the detection of each individual teat is accomplished rapidly, since its location has already been established more or less. In the last scan it be checked whether or not the position of the teat has changed due to a change in the animal's position, for which purpose, in accordance with a further feature of the invention, the sensor continues to check the location of a teat's lower end during the movement of a teat cup towards said teat.

In accordance with a yet further feature of the invention, the sensor measures the distance by means of ultrasonic radiation. Then, an ultra-sonic signal is transmitted at brief intervals, which signal is received again after reflection against an object.

Moreover, in accordance with the invention, the location of the test's lower end is discerned by determining the direction of the sensor's perception and also the perceived distance at the instant when the end of a teat is recognized.

The invention furthermore relates to an implement for milking an animal, such as a cow, which implement includes means for ascertaining the position of one or more teats of the animal's udder and means for attaching the teat cups to said teat or teats. According to the invention, the implement is characterized by a substantially upwardly directed distance-measuring sensor which by means of a directed beam scans the udder so as to identify nearer portions of the udder as teats. In accordance with a further feature of the invention, the distance-measuring sensor is arranged approximately at the level of the floor on which the animal stands. In accordance with a yet further feature of the invention, the distance-measuring sensor pivots about two horizontal shafts located substantially perpendicularly relative to each other, so as to enable the scanning of the udder by means of a directed beam. The pivotal movement may be produced by stepper motors.

In accordance with a still further feature of the invention, the distance-measuring sensor measures the distance by means of ultra-sonic radiation, and the distance-measuring sensor includes a hollow reflector to produce a focussed beam. Additionally, in accordance with the invention, the distance-measuring sensor may be arranged near the location of the teat cups in the resting position.

In accordance with a further feature of the invention, each teat cup may be provided with moving members for attaching same to the teat. Then, each teat cup may include a first moving member to cause a subframe to pivot in a substantially vertical plane, a second moving member connected to said subframe to cause a third moving member to pivot in a substantially vertical plane which is approximately perpendicular to said first-mentioned plane, which third moving member is capable of moving the teat cup in a substantially upward direction. In this manner, the teat cup can be moved to any position desired. In accordance with a feature of the invention, at least one moving member, e.g. the third one, may have a telescopically sliding portion.

Furthermore, in accordance with the invention, the teat cup may be connected via a teat cup support to the means for attaching the teat cup to the teat, said teat cup being arranged in the teat cup support under spring action. In this situation, in accordance with the invention, the teat cup support may have an aperture through which the teat cup extends, a coil spring which bears against the teat cup and also against the teat cup support being provided around said teat cup. In accordance with a feature of the invention, this spring may be a relatively weak coil spring, so that the teat cup can be moved easily downwards relative to said teat cup support.

Furthermore, in accordance with the invention, portions of the implement may be accommodated in the floor on which the animal stands. To that end, the floor may be provided with an aperture having an upwardly directed, raised edge, which aperture may be closable.

Alternatively, in accordance with the invention, the means for attaching the teat cups may be accommodated in a movable frame, which frame can be moved under the animal, preferably in the longitudinal direction relative to said animal.

In addition, in accordance with the invention, there may be provided means for determining the direction of the sensor's perception and also the distance perceived. By means of these parameters the location of the perceived extreme end of the teat is fully established, so that the teat cup can be moved thereto, e.g. by means of a robot arm.

For a better understanding of the present invention and to show how the same may be carried into effect, reference will now be made, by way of example, to the accompanying drawings which show an embodiment of an implement for automatically milking animals.

DESCRIPTION OF THE PREFERRED EMBODIMENT

Figure 1:
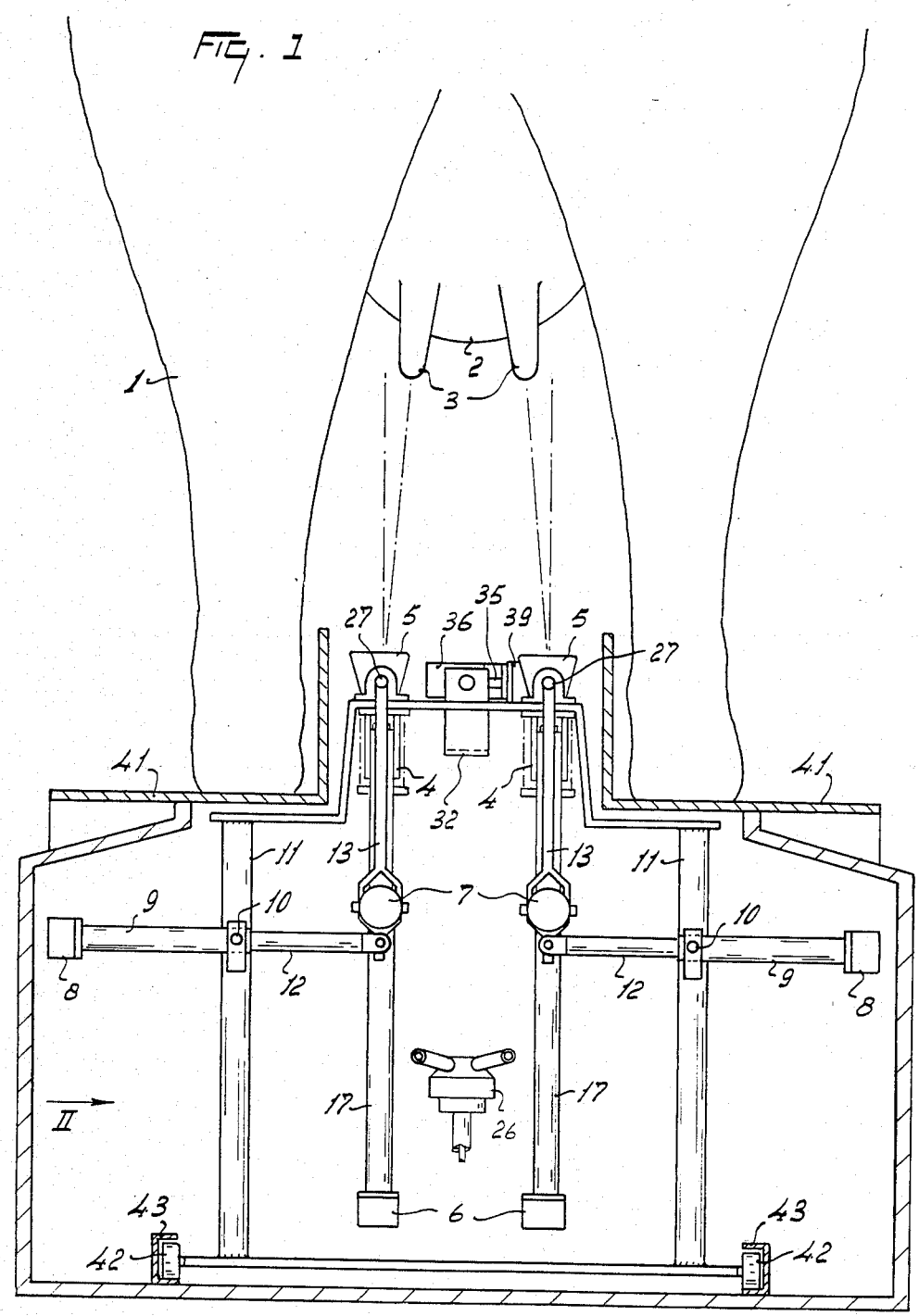
FIG. 1 is a cross-sectional view of the implement.

The embodiment is only shown schematically in the drawings and while corresponding components in the various figures have been given the same reference numerals.

FIG. 1 schematically shows a rear view of a cow 1, in which view the udder 2 with teats 3 are visible between the hindlegs. An implement capable of moving the teat cups 4 to the teats 3 is arranged partially in the floor, substantially below the udder 2. This embodiment has four teat cups 4 (see FIG. 3), but FIGS. 1 and 2 each show only two of them. Each teat cup 4 has a flexible, funnel-shaped upper portion 5 which is adapted to embrace the teats. Each teat cup can be moved by its support to the previously established position of the teat, because said support is provided with three motors 6, 7 and 8, e.g. electric motors, preferably stepper motors. Each motor is mounted on a telescopically slidable moving member. The moving member 9, which comprises a motor 8, is arranged pivotally about a shaft 10 in a frame 11 of the implement. Part 12 of the moving member 9 is axially movable by means of motor 8, causing a subframe 13 to be rotated about shaft 14. Thus, as is apparent from FIG. 1, the teat cup 4 can be directed to the relevant teat in a substantially vertical transverse plane relative to the animal 1.

Figure 2:
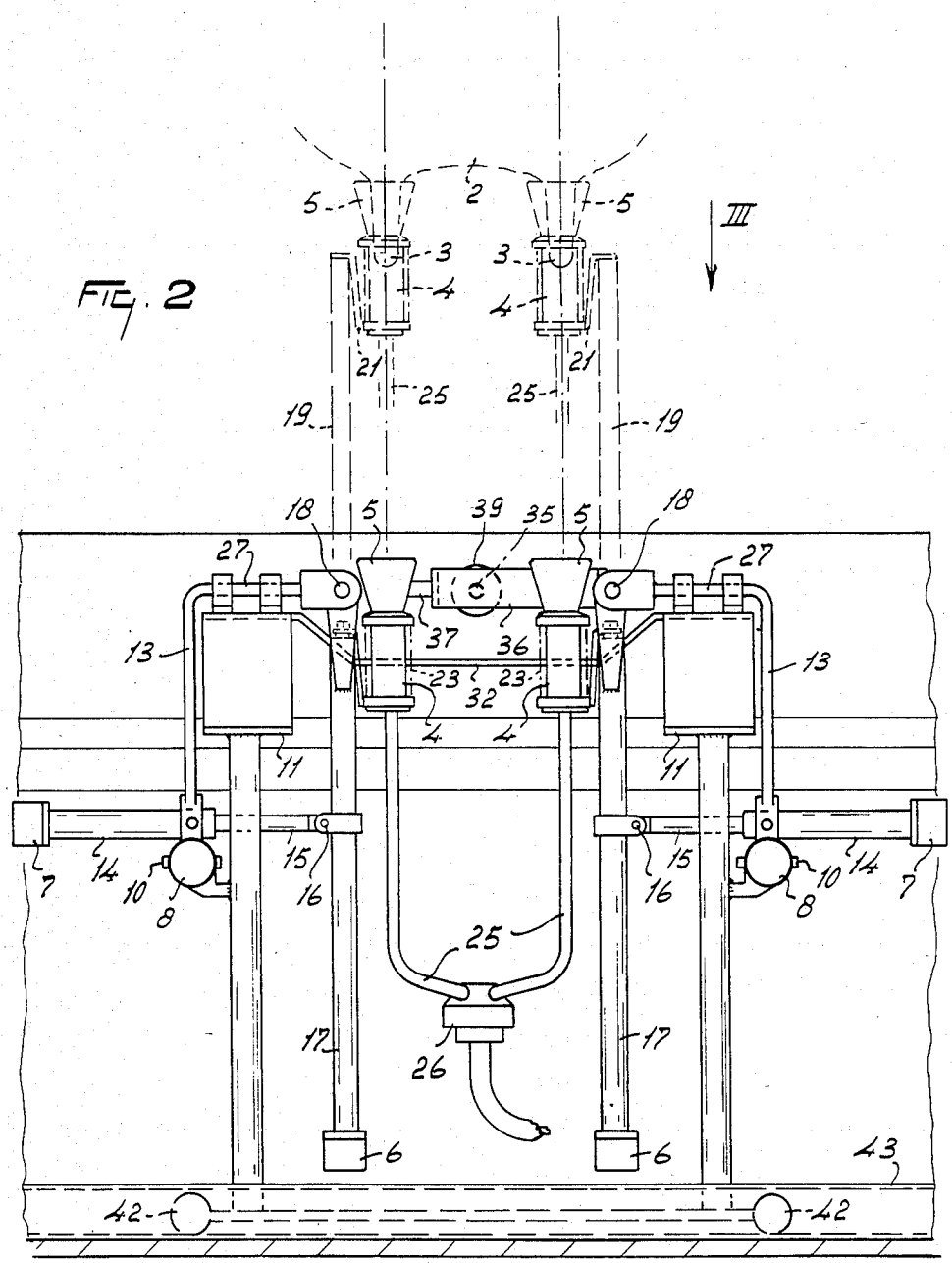
FIG. 2 is a longitudinal sectional view of the implement.

As is apparent from FIG. 2, shaft 14, which is connected to the subframe 13, comprises a second moving member and includes a portion 15 which can be displaced axially by means of motor 7. Portion 15 of moving member 14 is connected by means of hinge pin 16 to a third moving member 17 which is supported, so as to be capable of pivoting about shaft 18, in subframe 13. By means of moving member 14 teat cups 4 are directed to the relevant teats in a substantially vertical longitudinal plane relative to the animal 1 (i.e. substantially whether the plane of FIG. 2).

It will be clear that the desired position of moving member 17 is attained by adjusting moving members 9 and 14 so that the teat cup 4 is directed to the corresponding teat 3, whereafter a portion 19 (FIG. 4) of moving member 17 is extended outwardly by means of motor 6 so that the teat cup 4 connected to portion 19 is moved to the corresponding teat 3 in an appropriate manner.

Figure 4:
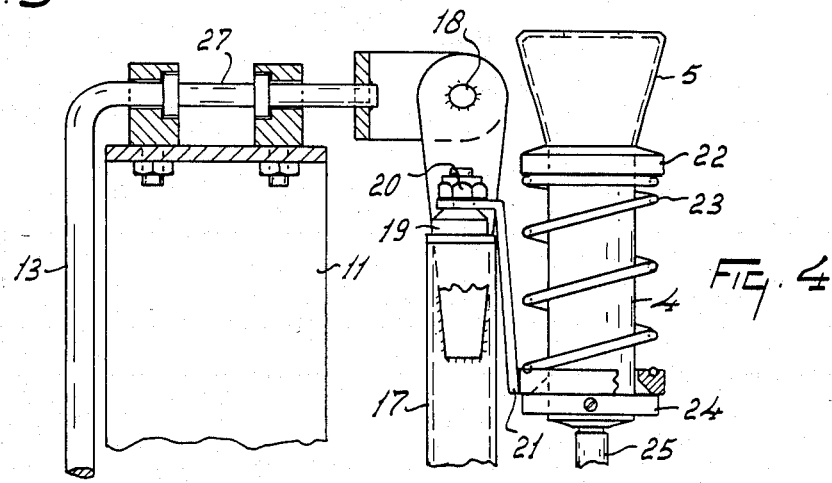
FIG. 4 shows a detail of FIG. 2.

FIG. 4 shows in greater detail the manner in which the teat cup 4 with the flexible upper portion 5 is mounted on a respective telescopically slidable portion 19 of moving member 17. In this situation, the moving member 17 is connected to the subframe 13 capable of pivoting about shaft 18, which subframe 13 is connected to the frame 11 capable of pivoting about shaft 27. By means of a nut 20, a teat cup support 21 is mounted on the slidable portion 19 of moving member 17. The teat cup 4 is axially movable in said teat cup support 21, a compression spring 23 being provided between said teat cup support 21 and a ring 22 fitted to the teat cup 4, whereby the teat cup can be pushed upwardly. In FIG. 4 stop ring 24 of the teat cup 4 bears against the bottom side of the teat cup support 21, causing the teat cup 4 to be in its highest position relative to the teat cup support 21. Compression spring 23 is a relatively weak spring, so that the teat cup 4 can be moved easily downwardly relative to the teat cup support 21, in particular when the teat cup 4 bears against the udder of the animal 1 with its funnel-shaped upper portion 5.

Each teat cup 4 is connected to the automatic milking machine by means of one or more flexible tubes. The drawings show only one flexible tube 25 for each teat cup, said tube 25 being connected to the automatic milking machine via the milking claw 26.

Each teat cup 4 can be moved to the relevant teat 3 of the udder 2 of the animal 1 after the location of the teat 3, more specifically its end, has been established.

For three-dimensionally establishing (i.e. by means of three parameters) the teat end use is made of a sensor 31 capable of perceiving the distance to an object. For example, for this purpose it is possible to use a sensor which transmits an infrared beam and then receives the reflection of that beam from the udder and teats.

Figure 3:
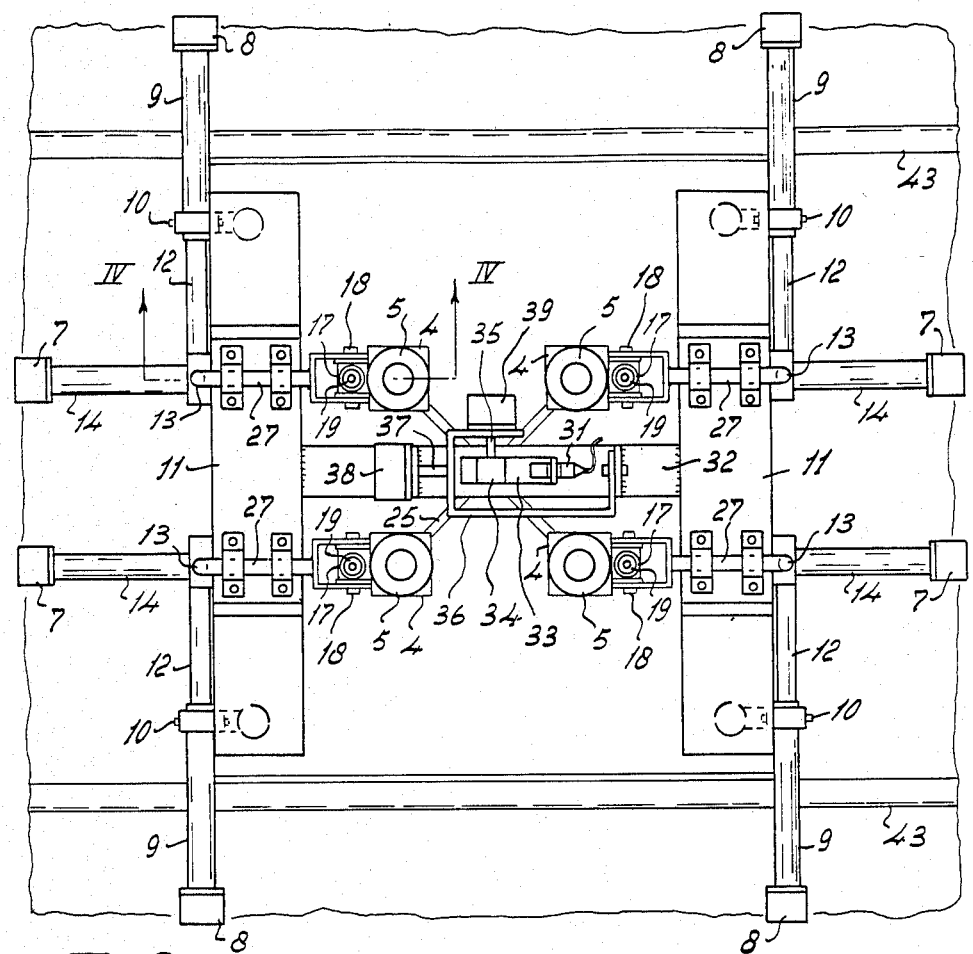
FIG. 3 is a plan view taken in the direction of the arrow III of FIG. 2.

FIG. 3 is a plan view of the implement, in which view is shown that between the four teat cups 4 there is provided on the frame 11 a support 32, on which the sensor 31 is mounted. In this embodiment, the sensor 31 is directed substantially horizontally and attached to the sensor unit 33, which also bears a reflector 34 which gives the substantially horizontally transmitted sensor beam a substantially upward direction. By using such a reflector 34, which may be slightly concave in shape, a more concentrated and directed sensitivity of the sensor 31 can be obtained. The sensor unit 33 is attached in the intermediate section 36, capable of pivoting about shaft 35, which intermediate section 36 is connected to the support 32, capable of rotation about shaft 37. The intermediate frame 36 can be rotated about shaft 37 by means of a motor 38, preferably a stepper motor, while the sensor unit 33 can be rotated about shaft 35 by means of a motor 39 which, for example, is also a stepper motor. It will be clear that the sensor unit 33 can be disposed in any position desired using the two motors 38 and 39, so that the beam emitted by the sensor 31 can be correspondingly directed desired.

In the manner as described, the sensor 31 is capable of scanning the udder of the animal standing over it, e.g. by zigzagging across the entire area. The sensor 31 then always measures the distance to the udder and, when a significantly smaller distance compared to the surroundings is measured, this implies that the extreme end of a teat has been detected. Since the detection is effected from below, the location of the teat's end is defined as an object closer to the sensor than objects in the region around said teat's end. As the angular position of the sensor unit 33 both relative to the shaft 35 and to the shaft 37 is known at the moment when the end of a teat has been detected, and as also the distance to that teat end has been measured, the three-dimensional position of the teat end has been established. To that end, setting data for the motors 38 and 39 are processed in a processor (not shown), which processor is also capable of controlling the motion of the teat cups 4. Therefore after the location of the extreme end of a teat has been established, one of the teat cups 4 can be attached to said teat.

For detecting the teats 3 and attaching thereto the respective teat cups 4 several procedures may be followed. For example, the sensor may scan first the entire udder to check whether all the teats have been perceived, whereafter, during the attachment of each individual teat cup, the sensor directs itself to the relevant teat to observe any displacement. Alternatively, it is possible for all the teat cups to be attached simultaneously once the position of all the teats has been established.

In the embodiment shown, the implement can be moved below the level of the floor 41 in the longitudinal direction relative to the animal by means of guide wheels 42 moving in rails 43. Alternatively, it is possible, of course, to move the sensor unit 33 laterally, instead of pivoting same, with the object of scanning the cow's udder.

The ultra-sonic sensor 31 can be used with or without a reflector 34. Usually, such a sensor can measure distances of between one hundred, fifty and two thousand millimeters. The radiation may be emitted at an angle of 10°. This angle can be reduced to 4° by means of a concave reflector, which enables a measurement with increased directivity. The sensor detects the distance to the nearest portion of an object located within the area covered by the sensor's beam.

Having disclosed our invention, what we claim as new and to be secured by Letters Patent of the United States is:

1. An implement for milking an animal such as a cow comprising:
    scanning means for determining the disposition of one or more teats of the animal's udder, said scanning means comprising a substantially upwardly directed distance-measuring sensor;
    attachment means for attaching teat cups to the teat or teats, said attachment means comprising moving members for each said teat cup and a subframe interconnected to a corresponding said teat cup, wherein each said teat cup is provided with a first said moving member to cause said subframe to pivot in a substantially vertical plane, a second said moving member connected to said subframe to cause a third said moving member to pivot in a substantially second vertical plane which is approximately perpendicular to said first-mentioned plane, said third moving member being adapted to move the corresponding said teat cup in a substantially upwardly direction.

2. An implement as claimed in claim 1 wherein said distance-measuring sensor is arranged approximately at the level of the floor on which the animal stands.

3. An implement as claimed in claim 1 comprising stepper motors which are arranged to pivot each said third moving member such that said teat cup mounted on said third moving member may be displaced latitudinally and longitudinally in a substantially horizontal plane.

4. An implement as claimed in claim 3 wherein said directed scan comprises ultra-sonic radiation and said distance-measuring sensor includes responsive means that measures distance by means of reflections from said ultra-sonic radiation.

5. An implement as claimed in claim 4 wherein said distance-measuring sensor includes a concave reflector for focusing said beam.

6. An implement as claimed in claim 4 wherein said distance-measuring sensor is centrally arranged between said teat cups.

7. An implement as claimed in claim 1, wherein said moving members are provided with an axially slidable portion.

8. An implement as claimed in claim 1 comprising supporting means and a resilient member for resiliently supporting each said cup, each said supporting means connected to said third moving member, the corresponding said teat cup arranged in said supporting means so as to be urged in an upwardly direction by said resilient member.

9. An implement as claimed in claim 8 wherein said supporting means has an aperture through which the corresponding said teat cup extends, said resilient member comprising a coil spring which bears against such teat cup and also against said supporting means, said coil spring being provided around such teat cup.

10. An implement as claimed in claim 9 wherein said coil spring is a relatively weak compression spring.

11. An implement as claimed in claim 1 wherein said moving members are in substantial part accommodated below a floor on which the animal stands when said teat cups are attached to the animal's teats.

12. An implement as claimed in claim 11 wherein said floor is provided with an aperture having an upwardly directed, raised edge.

13. An implement as claimed in claim 12 comprising means for closing said aperture.

14. An implement as claimed in claim 1 comprising a movable frame which supports said moving members, said movable frame adapted to be moved under the animal to be milked.

15. An implement as claimed in claim 14 wherein said frame is adapted to be movable in the longitudinal direction relative to said animal to be milked.

16. An implement as claimed in claim 1 wherein said distance-measuring sensor comprises means for determining the direction of each teat of the animal to be milked and the distance of said teat from the corresponding said teat cup.

17. A mechanism for automatically attaching teat cups to an animal which comprises four teat cups, four teat cup supports, each said teat cup support independently supporting a corresponding said teat cup, four vertically disposed and vertically movable members, each said vertically disposed and vertically movable member independently carrying a corresponding one of said teat cup supports, four separately powered first motor means adapted independently to raise and lower a corresponding said movable member together with its associated teat cup support and teat cup, and each said vertically disposed and vertically movable member further being provided with two horizontally disposed and horizontally movable members, said horizontally movable members being disposed transverse to one another and each being provided with powered motor means adapted independently to displace a corresponding said vertically movable member with associated teat cup to adjust the horizontal position of said associated teat cup so that said vertically movable members are adapted to be extended upwardly towards the teats as disposed on said animal whereby said teats are received in said teat cups when said teat cups are raised by said movable members while in alignment with said teats.

* * * * *

UNITED STATES PATENT AND TRADEMARK OFFICE
CERTIFICATE OF CORRECTION

PATENT NO. : 4,805,557

DATED : FEBRUARY 21, 1989

INVENTOR(S) : ARY VAN DER LELY AND CORNELIS J.G. BOM

It is certified that error appears in the above-identified patent and that said Letters Patent is hereby corrected as shown below: On the title page Identification of Assignee, item [73], delete "Cornelis van der Lely, N.V." and insert therefor --C. van der Lely, N.V.--

Signed and Sealed this

First Day of August, 1989

Attest:

DONALD J. QUIGG

Attesting Officer

Commissioner of Patents and Trademarks